United States Patent [19]

Glaser et al.

[11] E Re. 31,257

[45] Reissued May 31, 1983

[54] ADJUSTABLE GUIDE VANES FOR AN AXIAL FLOW ROTARY SEPARATOR

[75] Inventors: Fritz Glaser, Zweibrücken; Christoph Gortz, Mutterstadt; Kurt K. Bühler; Josef W. Klimmer, both of Zweibrücken; Rene Laberheim, Volmünster; Klaus H. Pauli, Homburg; Werner Velten, Contwig, all of Fed. Rep. of Germany

[73] Assignee: Deere & Company, Moline, Ill.

[21] Appl. No.: 296,618

[22] Filed: Aug. 27, 1981

Related U.S. Patent Documents

Reissue of:

[64] Patent No.: 4,258,726
Issued: Mar. 31, 1981
Appl. No.: 55,093
Filed: Jul. 5, 1979

[30] Foreign Application Priority Data

Jul. 8, 1978 [DE] Fed. Rep. of Germany ..... 2830104

[51] Int. Cl.[3] ..... A01F 12/28
[52] U.S. Cl. ..... 130/27 L; 130/27 S
[58] Field of Search ..... 130/27 R, 27 L, 27 S, 130/27 T

[56] References Cited

U.S. PATENT DOCUMENTS

| | | | |
|---|---|---|---|
| 33,109 | 8/1861 | Standish | 130/27 S |
| 509,490 | 11/1893 | Richter | 130/27 S |
| 689,828 | 12/1901 | McIntire | 130/27 L |
| 885,620 | 4/1908 | Huff | 130/27 L |
| 990,007 | 4/1911 | Reason | 130/27 T |
| 2,053,148 | 9/1936 | James | 130/27 T |
| 2,517,184 | 8/1950 | Elliott et al. | 56/249 |
| 2,927,694 | 3/1960 | Scranton et al. | 206/283 |
| 3,156,245 | 11/1964 | Hobbs | 130/27 L |
| 3,828,793 | 8/1974 | Gochanour | 130/27 T |
| 3,949,761 | 4/1976 | Mortier et al. | 130/27 L |
| 4,244,380 | 1/1981 | DePauw et al. | 130/27 T |
| 4,330,000 | 5/1982 | Peilar | 130/27 L |

FOREIGN PATENT DOCUMENTS

| | | | |
|---|---|---|---|
| 172231 | 6/1906 | Fed. Rep. of Germany | 130/27 L |
| 1399602 | 7/1975 | United Kingdom | 130/27 L |

OTHER PUBLICATIONS

"Handbook for Axial-Flow Combines", International Harvester Co., Chicago, Illinois, Apr. 1978, p. 68.

*Primary Examiner*—Paul J. Hirsch

[57] ABSTRACT

In an axial flow rotary separator for a combine harvester, a series of parallel guide vanes are mounted inside the upper portion of the separator housing. The guide vanes are each helically disposed and parallel to each other and they cooperate with the separator rotor so that as the rotor is rotated crop material which has been fed to an upstream end of the separator is propelled downstream as a mat in the annular space between rotor and housing, the guide vanes engaging the mat of material and deflecting it downstream as it is propelled circumferentially by the rotor so that any given portion of the mat is propelled downstream in an approximately helical path. The guide vanes are characterized in that they have a first fixed or leading portion which first engages the crop material and a second trailing portion which is adjustable with respect to the first and with respect to the separator housing so that the effectiveness of the guide vane as a whole may be selectively varied with regard to its helically propelling or deflecting effect. Several embodiments are disclosed including a guide vane fixedly pivoted at its leading end and with its trailing end radially adjustable inwards and outwards; a version in which a trailing portion of the guide vane is adjustably pivotable about an approximately radially extending pivot axis; a version in which the length of the trailing portion is adjustable through a telescoping arrangement and another in which a rotatable or displaceable element effectively provides three interchangeable housing wall portions, each wall portion carrying a guide vane trailing portion of a different pitch.

10 Claims, 13 Drawing Figures

ADJUSTABLE GUIDE VANES FOR AN AXIAL FLOW ROTARY SEPARATOR

Matter enclosed in heavy brackets [ ] appears in the original patent but forms no part of this reissue specification; matter printed in italics indicates the additions made by reissue.

BACKGROUND OF THE INVENTION

The present invention relates to axial flow rotary separators of the type which may be used in a combine harvester and in which crop material is propelled downstream in a generally helical path while being processed within a separator housing and more particularly to an improved internal guide vane arrangement for the separator housing.

It is well known to provide a housing for receiving a threshing and separating rotor with, secured to the inside of the housing, numerous guide vanes or bars which are arranged in a helical configuration. Conventionally, the guide vanes are fixed so that the rate of throughput of crop material can be varied only by changing the speed of rotation of the rotor.

It is also known to mount guide vanes with a fastening arrangement including an alternate set of mounting holes which permit the helical angle of the vane with respect to the separator housing to be adjusted to a second position so that the rate of axial progression of the crop material through the housing is changed. However, the adjustment possible with this design is limited to only two distinct positions and is inconvenient to make.

SUMMARY OF THE INVENTION

Accordingly, it is an object of the present invention to provide a guide vane arrangement offering more convenient and effective adjustment of guide vane and also a mode of adjustment which is not limited to changing the disposition of the complete guide vane or only to change of helix angle.

It is a feature of the present invention that the guide vane comprises a fixed first or leading (in terms of rotor rotation or of engagement by the moving mat of crop material) and an adjustable trailing portion contiguous or continuous with the leading portion, adjustment of the trailing portion being effective to substantially change the character and effect of the guide vane as a whole. Adjustable guide vanes of this type may be used to vary the rate of axial progression of crop material through the separator so as to control the efficiency of threshing and separating. If, for example, excessive losses of grain in discharged straw occur, the crop material feed rate can be reduced by adjustment of the trailing portion so as to, for example, effectively vary the angle of inclination or the pitch of the guide bars. In accordance with the invention, it is advantageous for the guide bars to be arranged adjustably oppositely or transversely with respect to the direction of movement of the crop material in the threshing and separating housing. For this purpose, it is advantageous for the guide bars to be mounted pivotally horizontally and/or vertically and to be capable of being secured in any desired position. It is also advantageous for the guide bars to be adjustable by way of a control means. The control means may permit all guide bars to be adjusted simultaneously in a simple manner.

For automatic adjustment of the throughput or to avoid blockages, there may be provided, in accordance with the invention, a sensing means which detects the rate of throughput of crop material in the threshing and separating housing, which sensing means is directly or indirectly connected to a sender for controlling the control means. It is also preferable for the guide bars to cover approximately 50% of the circular periphery of the threshing and separating housing, to extend in a helical screwthread configuration, and to be jointly adjustable by way of the control means. The guide bars may cover the entire periphery of the threshing and separating drum or housing, if this should be necessary because of the nature of the crop material. In most cases, however, it is sufficient if the guide bars cover only 50% of the circular periphery of the threshing and separating housing.

According to the invention, the separator housing may be provided with slot-like openings, for receiving the guide bars. The slot-like openings form a convenient way of mounting the adjustable part of the guide bars. It is also possible for the guide bars to be displaced in said openings. In this respect, it is advantageous for the *adjustable portion of the* guide bars to be pivotally connected at one end to the separator housing [and to be pivotally connected at the other end to the control means], and for the guide bars to be provided at least in the upper half of the threshing and separating basket and for a part of the guide bars to be stationary, with the remaining part adjustable. Depending on the nature of the crop material, it is sufficient for only a part of the guide bars to be adjustable. If, for example, the pivotal part of the guide bars is pivoted out of the plane of the threshing and separating housing, this also causes the resistance for the crop material and the axial feed rate to be reduced.

In order to provide for common adjustment of all guide bars, it is advantageous for the guide bars to be joined together [at their ends] by way of a linkage means to which the control means is connected. It is also advantageous in one form of the invention for the stationary guide bars to have a forked mounting approximately in the upper middle region, with a displaceable guide bar being pivotally received in each of the fork mountings. This arrangement readily provides for a good connection and continuity between the stationary and the movable parts of the guide bar.

In another form, the helical guide bar may be divided to be received in a guide slot which is provided in the separator housing and to be displaceable telescopingly with respect to the stationary part of the guide bar thereby to shorten or increase the effective length of the guide bar. It is also possible for the stationary part of the guide bar to serve as a guide means or support means for the adjustable part of the guide bar.

In accordance with a further feature of the invention, the adjustable part of the guide bar may be arranged on a rotatably mounted and possibly radially displaceable holding means whose axis extends parallel to the longitudinal axis of the separator housing. The rotatable holding means may have a plurality of outward sides which carry guide bars of different pitches and extend over part of or the entire length of the threshing and separating housing to carry a plurality of successively disposed guide bars, the outward sides being arranged as seen in end view in a triangular or square or rectangular arrangement and which each cooperate and align in their operative position with the respective stationary guide bars. In this way, by rotating the holding means, the appropriate part of the guide bars can be inserted between two stationary parts of the guide bars or at the end of a fixed guide bar portion.

An advantage of the invention is that it is more convenient and feasible to adjust only a portion of the vane rather than the whole guide vane.

DESCRIPTION OF THE PREFERRED EMBODIMENT

The invention is embodied in an axial flow rotary separator for use in a self-propelled combine, the mode of operation of both separator and combine being well known.

Figure 1:
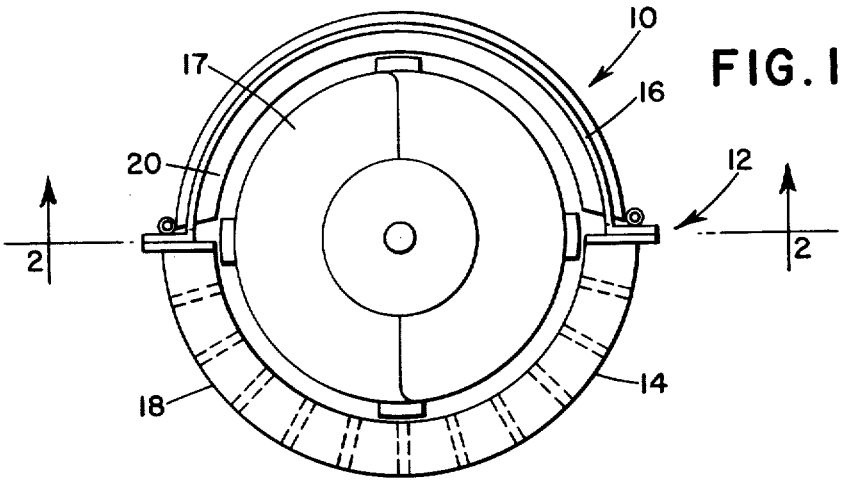
FIG. 1 shows a semi-schematic end view of a threshing and separating housing with threshing and separating rotor.
Figure 2:
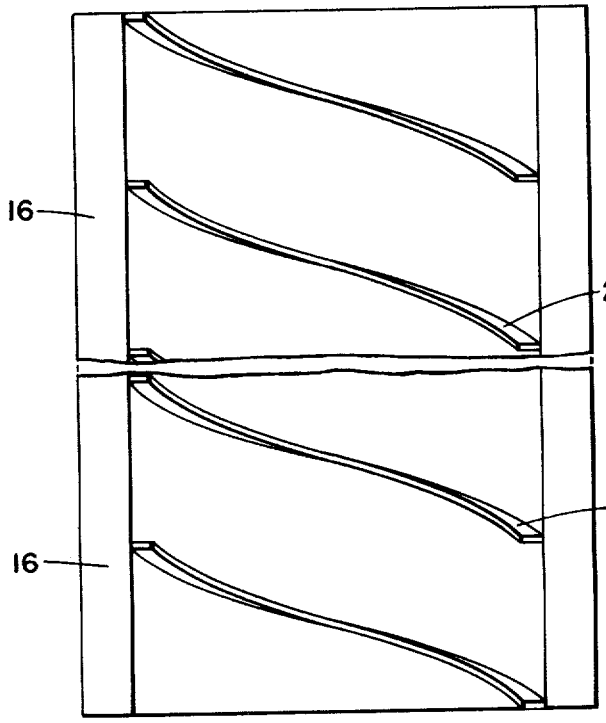
FIG. 2 is a view on line 2—2 of FIG. 1 showing the general arrangement of guide vanes in the upper half of the separator housing.

Referring to FIGS. 1 and 2, reference numeral 10 denotes a threshing and separating apparatus or separator which can be incorporated into a combine harvester which operates on the axial flow rotary principle. The longitudinal axis of the separator extends on the longitudinal centre plane of the combine harvester and the separator has a housing 12 which is formed from a lower threshing and separating concave or grate member 14 and an upper housing member 16, surrounding a rotor 17. The lower threshing and separting grate member 14 can be fixedly connected to the upper housing member 16 and can be formed from a screen-like lattice with threshing and separating bars and numerous through openings 18. On its inside, the upper housing member 16 has numerous successively disposed helically extending guide bars 20 which are cooperable with threshing and separating bars of the threshing and separting housing 12. It is also possible for the lower threshing and separating grate member 14 to be provided with guide bars.

Figure 3A:
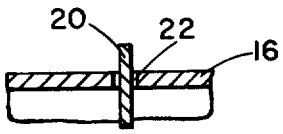
FIG. 3A is an enlarged view on line 3A—3A of FIG. 3 showing a guide vane adjustable in a housing slot.
Figure 3:
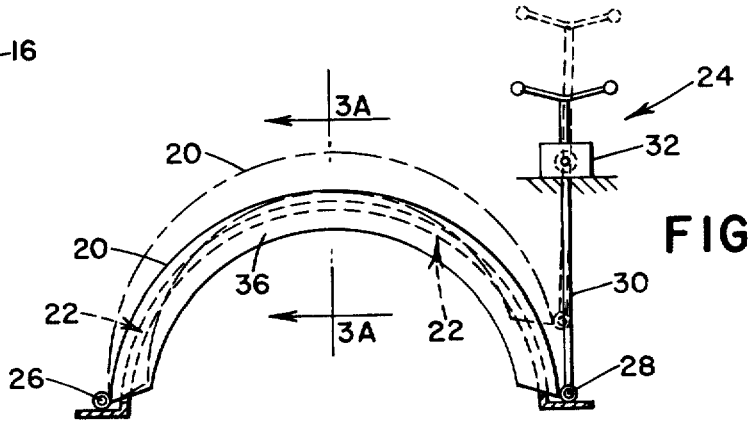
FIG. 3 is an end view of the upper half of the separator housing showing a radially adjustable guide vane.

Referring now to FIGS. 3 and 3A, the guide bars 20 are mounted adjustably in the upper housing member 16. For this purpose, the upper housing member 16 has slot-like openings 22 in which the guide bars 20 are guided and displaceable with respect to radial clearance between rotor and housing. In particular, each guide bar 20 may be connected at one (leading) end to the upper housing member 16 by way of a pivot pin 26 and at the other (trailing) end to control means 24 by means of a pivot pin 28. The control means 24 comprises a spindle 30 which is guided in a ball joint 32 in such a way that the spindle 30 can move vertically and with a pivotal motion. The spindle 30 is provided with a screwthread and can be screwed into the stationarily disposed ball joint. Each guide bar 20 may be moved up and down by way of the control means 24, thereby altering the effectiveness of the trailing end of the guide bar, which in turn influences the axial feed rate of the crop material.

It is also possible for a sensing means which detects the throughput of crop material to be provided within the separator housing 12. The sensing means may be directly or indirectly connected to a sender which controls the control means 24, so that, in the event of an overload of material in the apparatus, the control means 24 can adjust the guide bars 20 in order thereby to increase the rate of throughput of crop material, at least temporarily.

In the embodiment shown in FIG. 3, the guide bars 20 are only provided in the upper housing member 16 and are of substantially the same radius of curvature as the housing. A narrow web portion 36 of the guide bar 20 projects into the interior of the separator housing 12 or into the upper housing member 16. If, however, the radius of curvature of the guide bars 20 is greater than that of the upper housing member 16, the radial clearance between the guide bar 20 and the rotor 17 may continuously increase as it is raised with a pivotal movement.

Figure 4:
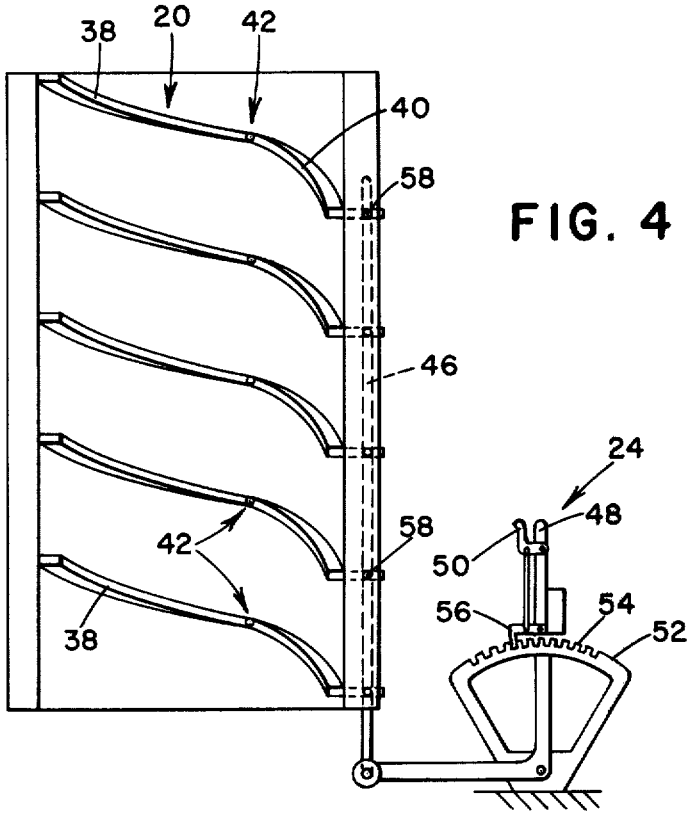
FIG. 4 is a view similar to FIG. 2 showing guide vanes adjustable about a radially extending pivot axis.
Figure 6:
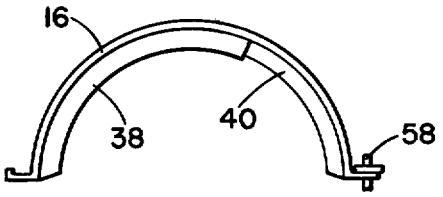
FIG. 6 is an end view similar to FIG. 3 of the embodiment of FIG. 4.
Figure 5:
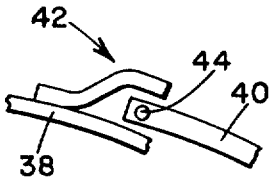
FIG. 5 is an enlarged detail of the junction between the fixed and adjustable portions of the embodiment of FIG. 4.
Figure 7:
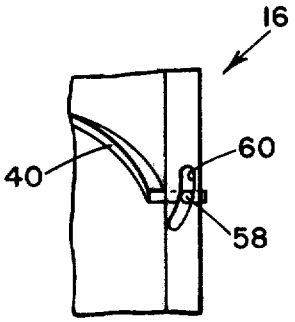
FIG. 7 is an enlarged detail of the connection of the adjustable portion of the guide vane embodiment of FIG. 4 to a control linkage.

In accordance with a further embodiment shown in FIG. 4, it is possible for the guide bars 20 to be constructed in two parts, one part 38 being fixedly connected to the separator housing 12 while the other part 40 is mounted in a fork mounting 42 for horizontal pivotal movement, by means of a pivot pin 44. The outer ends of the adjustable parts 40 of the guide bars are pivotally connected to a linkage means 46 which is pivotally connected to a control lever 48. The latter is pivotally mounted in a holder 52 which can be provided with a rack member 54. The rack member 54 cooperates with a locking member or detent 56 of a locking means 50. All the adjustable parts 40 of the guide bars 20 may be pivoted jointly and parallel to each other in the direction of movement of the crop material, by way of the control lever 48. In order to ensure that the guide bars are guided satisfactorily, each outer end of the parts 40 has a substantially vertically extending guide pin 58 which is guided in a circular guide slot 60 (see FIG. 7) provided in the cylindrical casing of the threshing and separating housing 12. The radius of the guide slot 60 has its centre point on the pivot pin 44. By pivoting the trailing portion 40, it is possible to change the effective pitch of the guide bar 20 and so change the axial feed rate.

Figure 8:
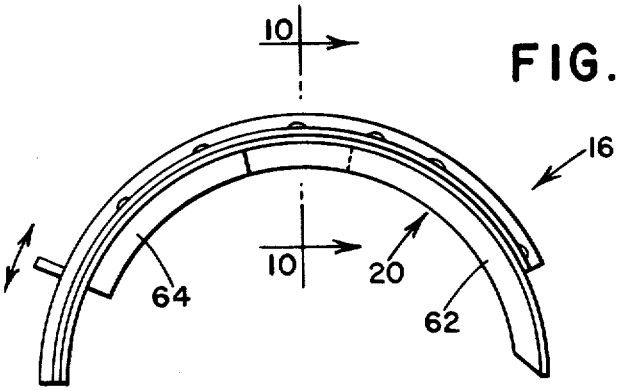
FIG. 8 is an end view similar to FIG. 3 but from the opposite end of a telescopic guide vane.
Figure 9:
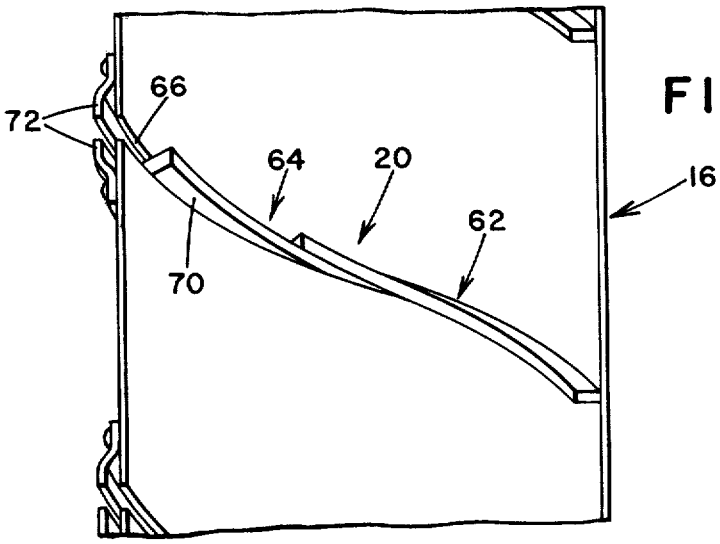
FIG. 9 is a view similar to FIG. 2 of the telescopic guide vanes.
Figure 10:
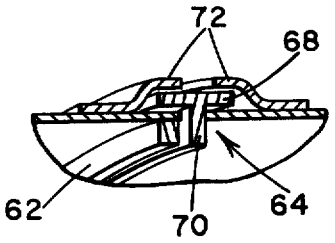
FIG. 10 is an enlarged view in cross section taken along line 10—10 of FIG. 8.

In accordance with a further embodiment (FIGS. 8 and 9), the helical guide bars 20 may be so constructed that they can be pushed or telescoped one into the other or can be adjusted by one guide bar passing or overlapping the other. For this purpose, a part 62 of the guide bar 20 is fixedly connected to the upper housing member 16 of the threshing and separating housing 12, while the other part 64 is displaceably accommodated in a helical guide slot 66 so that it can be pushed past the stationary part 62. The adjustable part 64 is tee-shaped in cross section, formed from a horizontally extending web portion 68 and a substantially vertically extending web portion 70 (FIG. 10). The web portion 70 projects through the guide slot 66 and bears against the stationary part 62. The horizontally extending web portion 68 is received by two guide rail portions 72. The parts 64 can also be adjusted by way of a common control means. With the guide bars which can be displaced relative to each other, the effective length of the guide bars can be altered, which again influences the crop feed rate.

Figure 11:
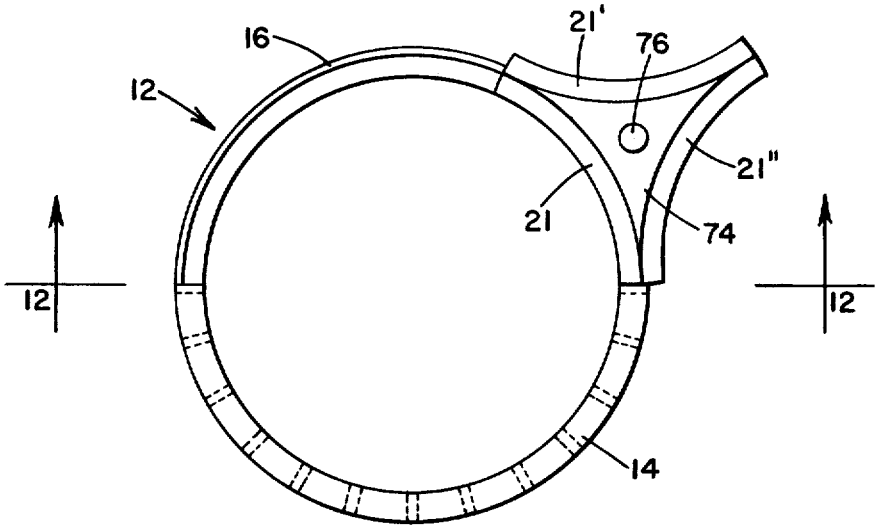
FIG. 11 is an end view similar to FIG. 1 of a further embodiment of adjustable guide vanes.
Figure 12:
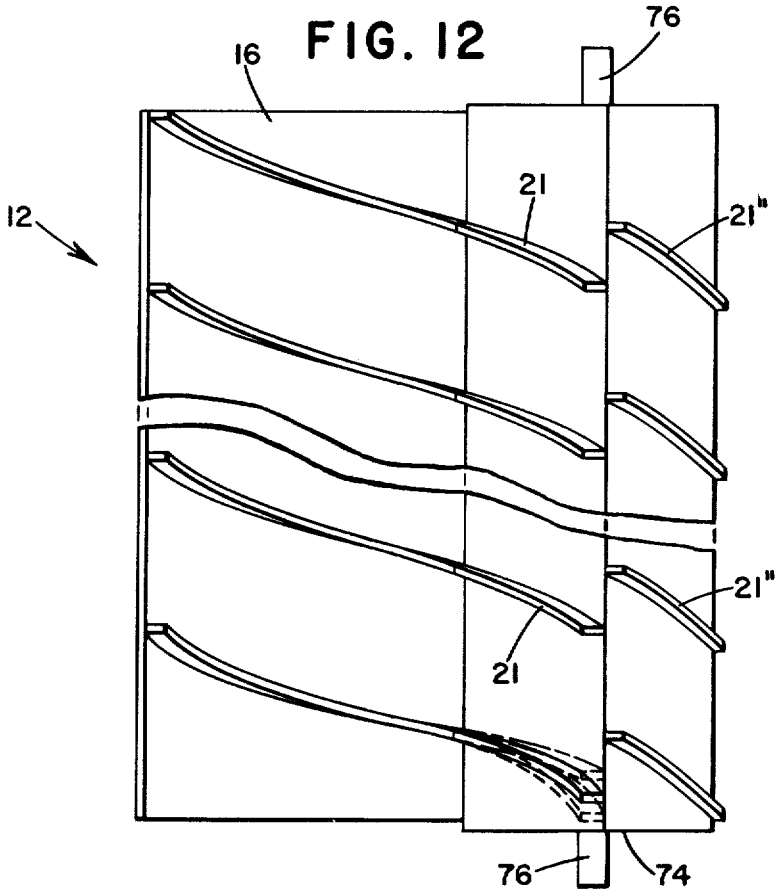
FIG. 12 is a view similar to FIG. 2 on line 12—12 of FIG. 11.

In accordance with a further embodiment (FIGS. 11 and 12), it is possible for guide bars of different pitches 21, 21' and 21" to be arranged on a rotatably mounted holding means 74 whose axis 76 extends parallel to the longitudinal axis of the separator housing 12. The axis 76 can be accommodated in mounting bearings (not shown) which may be radially displaceable and directly or indirectly connected to the separator housing 12. In the embodiment illustrated, the holding means 74 has three arcuate sides with each side carrying guide bars of a different pitch. It is also possible, however, for the holding means to be of a square or rectangular cross section so as to offer more range of adjustment. The guide bars on the holding means 74 cooperate with the guide bars which are fixedly arranged in the separator housing 12. However, the guide bars on the holding means 74 are of a different pitch from the fixed guide bars. In this way, it is possible for the crop material feed rate to be altered by rotating the holding means 74 as guide bars of a different pitch can thus be aligned with the stationary guide bars. The holding means 74 may extend over the entire length of the separator housing.

We claim:

1. In an axial flow rotary separator for a combine, including a housing and a rotor rotatably mounted within [and concentric with] the housing and carrying on its surface a plurality of material-treating and controlling elements, the housing being generally cylindrical in form and having a generally cylindrical wall with an upstream inlet end and a downstream outlet end, rotor and housing cooperating as the rotor rotates to process crop material introduced to the housing at the upstream end while transferring it to the downstream end, an improved means for controlling the axial progress of the crop material through the housing comprising:

a plurality of spaced apart elongated guide bars, each bar being raised generally radially inwards from the housing wall and being disposed generally helically so as to engage crop material being propelled circumferentially by the rotor [within the annular space], the helical disposition being such that relative movement between the material and the guide bar deflects the material axially towards the outlet end of the housing, each guide bar including with respect to crop material circumferential movement a leading portion and a trailing portion, the leading portion being [substantially] fixed in positional relationship to the housing [and carried by the housing] and the trailing portion being operatively associated with and essentially [continuing] *extending* the leading portion and selectively adjustable with respect to *and independently of* the leading portion so as to vary the effectiveness of the guide bar in deflecting crop material axially.

2. The invention defined claim 1 and further including control means operatively associated with the trailing portion of each guide bar for effecting the adjustment of the trailing portion.

3. The invention defined in claim 2 wherein each guide bar portion has an inner edge spaced radially from the rotor periphery so as to define a radial clearance and wherein the trailing portion of the guide bar is adjustable so as to vary the radial clearance *of said trailing portion only*.

4. The invention defined in claim 3 wherein the trailing portion of the guide bar is [pivotally connected to] *supported by* the housing wall for swinging movement about an axis approximately parallel to the rotor axis for effecting the adjustment in radial clearance *of the trailing portion* and the housing wall includes a plurality of elongated slots, each slot registering with the trailing portion of a guide bar for accomodating the swinging movement of the guide bar.

5. The invention defined in claim 2 wherein the trailing portion of the guide bar is guided and supported by the housing wall and is closely spaced from and circumferentially overlaps the guide bar leading portion and wherein the guide bar trailing portion is adjustable circumferentially to vary the overlap of said leading and trailing portions for effectively changing the length of the [trailing portion] *guide bar*.

6. The invention as defined in claim 5 wherein each guide bar trailing portion is formed in a tee cross section having a top flange conforming to and lying outside of the housing wall and wherein the housing wall includes a plurality of slots, each slot accommodating and guiding the guide bar trailing portion and further including retaining means carried by the housing wall for retaining the guide bar trailing portion top flange adjacent the exterior of the housing wall.

7. The invention defined in claim [2] *8* wherein each guide bar trailing portion is pivotally [connected to] *supported by* the housing wall adjacent the leading portion for swinging movement about an axis approximately radial to the rotor axis for changing the effective pitch of the guide bar.

8. The invention defined in claim 2 wherein the control means includes means for changing the effective pitch of the guide bar as a whole by adjusting the pitch of the trailing portion relative to that of the leading portion.

9. The invention defined in claim 8 wherein the means for changing the effective pitch of the guide bar includes a variable position element having a plurality of faces, each face approximately matching the contour of the interior of the cylindrical surface of the housing wall and carrying a plurality of guide bar trailing portions and wherein the housing wall includes an elongated parallel-sided opening for accommodating a face of the variable position element and wherein the variable position element may be disposed selectively to present any one of its several faces in the slot in the housing wall so that the housing wall is functionally completed and places a plurality of guide bar trailing portions in juxtaposition with and functional cooperation with fixed guide bar leading portions, each variable position element face carrying guide bar trailing portions of a different pitch.

10. The invention as defined in claim 2 wherein the control means includes linkage means interconnecting the guide bar trailing portions for facilitating adjustment of those portions similarly and simultaneously.

[11. In an axial flow rotary separator for a combine, including a housing and a rotor rotartably mounted within and concentric with the housing and carrying on its surface a plurality of material-treating and controlling elements, the housing being generally cylindrical in form and having a generally cylindrical wall with an upstream inlet end and a downstream outlet end, rotor and housing cooperating as the rotor rotates to process crop material introduced to the housing at the upstream end while transferring it to the downstream end, an improved means for controlling the axial progress of the crop material through the housing comprising:

a plurality of spaced apart elongated guide bars, each bar being raised generally radially inwards from the housing wall and having an inner edge spaced radially from the rotor periphery so as to define a radial clearance and being disposed generally helically so as to engage crop material being propelled circumferentially by the rotor within the annular space, the helical disposition being such that relative movement between the material and the guide bar deflects the material axially towards the outlet end of the housing, each guide bar including with respect to crop material circumferential movement a leading portion and a trailing portion, the trailing portion of the guide bar being rigidly attached to the leading portion and the leading portion being pivotally connected to the housing wall for swinging movement of the guide bar about a pivot axis approximately parallel to the rotor axis for effecting adjustment of the radial clearance of the guide bar so as to vary the effectiveness of the guide bar in deflecting crop material axially.]

* * * * *